United States Patent [19]
Christensen

[11] 3,821,971
[45] July 2, 1974

[54] PIPE PATCH
[76] Inventor: Clarence A. Christensen, 1002 Blaine St., Holdrege, Nebr. 68949
[22] Filed: June 26, 1972
[21] Appl. No.: 266,363

[52] U.S. Cl. ............................................. 138/99
[51] Int. Cl. ........................................... F16l 55/16
[58] Field of Search .......... 138/99, 92, 97, 98, 147, 138/161, 172; 287/111; 285/419; 24/19

[56] References Cited
UNITED STATES PATENTS

| | | | |
|---|---|---|---|
| 492,047 | 2/1893 | Otis et al. | 138/99 |
| 1,659,196 | 2/1928 | Fulton | 138/99 |
| 2,555,378 | 6/1951 | Shuter | 24/19 |
| 2,672,162 | 3/1954 | Brauer | 138/97 |

*Primary Examiner*—Charles A. Ruehl
*Attorney, Agent, or Firm*—Austin P. Dodge; Robert A. Ostmann

[57] ABSTRACT

A patch to be applied externally on a conduit and clamped in place from a station which may be axially remote from the patch.

6 Claims, 4 Drawing Figures

PATENTED JUL 2 1974    3,821,971

PIPE PATCH

BACKGROUND OF THE INVENTION

In the distribution of flowing granular materials in storage facilities it is common practice to make use of a central riser from which grain flows by gravity to a selected storage bin through a tubular conduit. Frequently these conduits span considerable distances at great heights. In the course of use leaks develop in the conduits. It is important that the distribution be completed with the least possible interruption. Hence patches must be immediately applicable. In the past the customary practice has been for a man to slide down the conduit and apply a split collar to close the leak. Obviously this is hazardous work and requires that a relatively skilled man be available at the storage facility.

THE INVENTION

The object of the present invention is to provide patch means which may be slid into place along the conduit from either its upper or lower end where there is a platform on which the operator can stand. The patch comprises a split sleeve which can be opened so as to be placed around the pipe. An operating mechanism releasably interconnects the longitudinal edges of the split in the sleeve. This mechanism is capable of positively moving the edges in both directions so that the sleeve may be tightened onto the pipe and so that the sleeve may be loosened and the patch moved. It is necessary that the sleeve can be loosened since a leak may develop at a point between existing patches. It will be necessary to move one of the existing patches to close the new leak and to apply a new patch on the old leak. The mechanism includes a longitudinally extending rotatable operator. A detachable handle can be connected with this operator. The handle may comprise several sections connected end to end. The handle is stiff enough to be used as the means to slide the loosened patch along the conduit to its desired position. The preferred embodiment of the invention will be described with reference to the accompanying drawing in which:

FIG. 1 in perspective view of the patch in place on a section of conduit.

Figure 1:
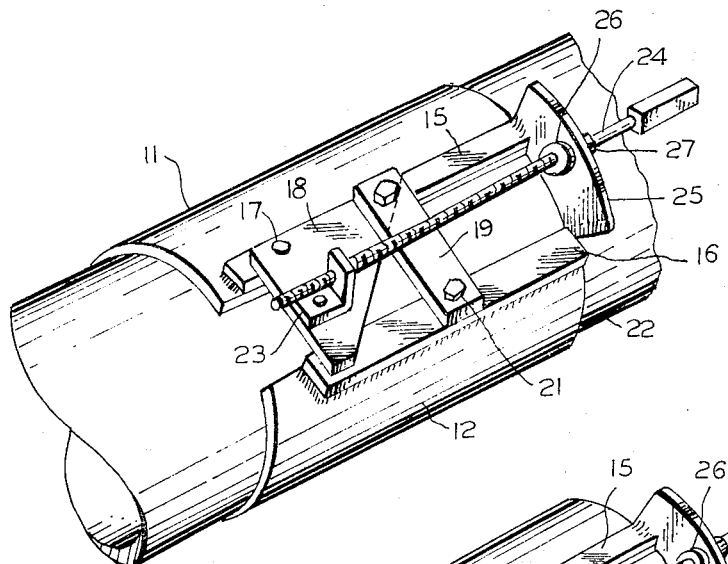
Figure 2:
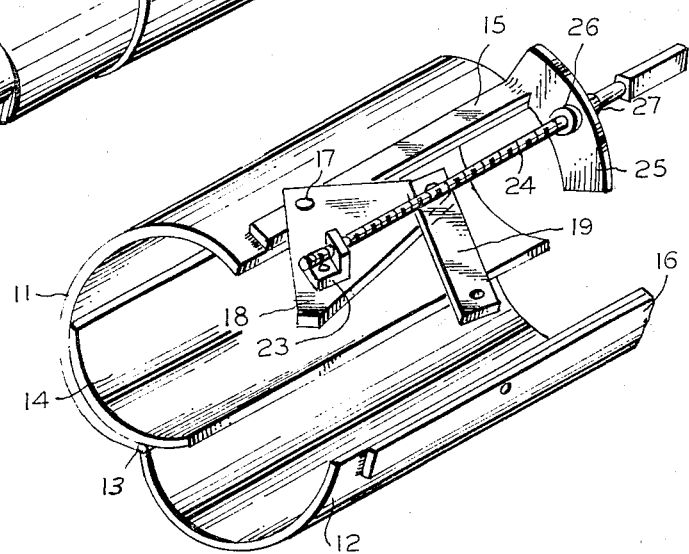
FIG. 2 is a perspective view of the patch in the open condition prior to its placement on the conduit.
Figure 3:
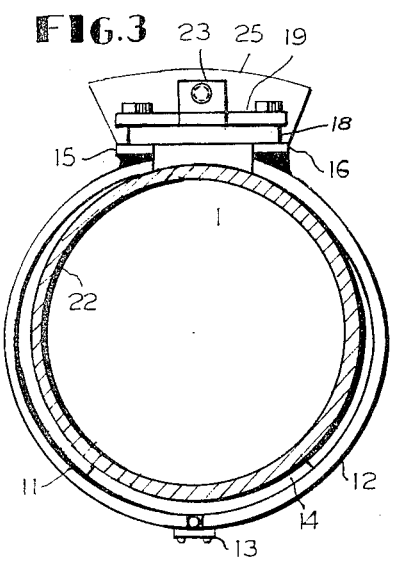
FIG. 3 is a transverse section of the conduit looking toward the lefthand end of the patch as shown in FIG. 1.

As best shown in FIGS. 1 and 2 the patch comprises generally semi-cylindrical sections 11 and 12 which are connected together by hinge 13. A curved insert 14 of elastomeric material is secured to section 11. Reinforcing stringers are welded to the opposite edges 15 and 16 of the split in the sleeve.

An operating mechanism releasably interconnects the reinforced edges 15 and 16. This mechanism comprises a bell crank 18. The apex of the crank 18 is pivotted about a journal 17 which projects from the edge 15. A swinging link 19 extends from one arm of the bell crank 18 and may be pivotally connected to the edge 16 by means of a cap screw 21. Cap screw 21 may be removed to permit the patch to be opened (as shown in FIG. 2) prior to its placement on a conduit, such as 22. A bracket 23 is swivelled on the other arm of crank 18. A threaded rotary actuator rod 24 is engaged in an opening in bracket 23. The threaded interconnection of rod 24 and bracket 23 serves as pairs of opposed thrust and reaction surfaces.

An arcuate guide 25 extends circumferentially from edge 15 toward edge 16. This guide is welded in place as shown. Actuator rod 24 extends through an opening the guide 25. Opposed thrust collars 26 and 27 are carried by rod 24 and engage the opposite faces of guide 25. The thrust collars 26, 27 and the guide 25 provide in effect second pairs of opposed thrust and reaction surfaces.

OPERATION AND USE OF THE INVENTION

Figure 4:
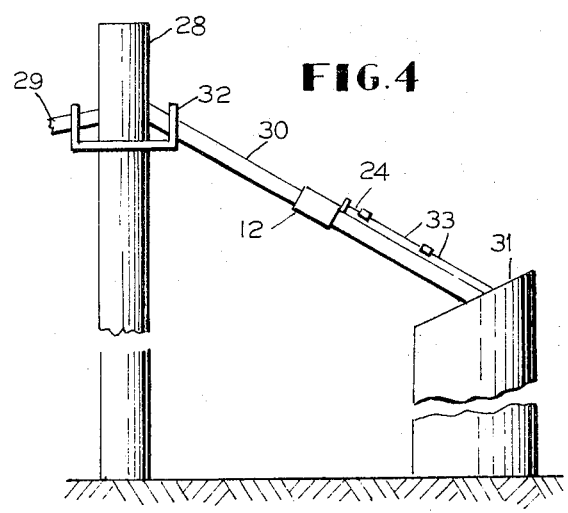
FIG. 4 is a schematic showing of a typical installation in which the patch may be used.

FIG. 4 shows a portion of a grain storage facility. It comprises an elevator column 28 connected by conduits 29 and 30 to storage buildings one of which is indicated at 31. A catwalk 32 is provided on the elevator 28 so that the appropriate valves may be opened to direct grain from the elevator to a selected storage building. The distribution conduits span considerable distances and may be 60 feet or more in the air. The conduits are subject to erosion by the grain and corrosion by exposure to the weather. It occurs not infrequently that a conduit will develop a leak. Obviously it is economically desirable to prolong the useful life of the conduit by patching. The application of a patch has in the past been performed by a worker who slid down the conduit to the point of leakage. This is a hazardous undertaking.

According to the present invention the patch may be applied to conduit 22 by disconnecting the actuating mechanism by remvoing cap screw 21. The sleeve can then be opened and the patch slipped over the conduit. The sleeve is then closed and cap screw 21 replaced. Actuator rod 24 is then rotated to draw the sleeve loosely around the conduit. A sectional handle or rod 33 (see FIG. 4) is slipped onto the square shank of rod 24 and the patch is pushed out onto the conduit to the place where leakage is occuring. The elastomeric insert 14 is positioned over the leak and the sleeve securely tightened onto the conduit by rotation of the handle 33. This rotation causes bracket 23 to be drawn toward the guide 25 swinging bell crank 18 about the pivot 17. Link 19 in turn draws edge 16 toward edge 15 closing the interval between these edges. The end of section 12 serves as follower slidable along guide 25 as patch closes against the pipe (see FIG. 1). The insert 14 is drawn tightly against the pipe and serves a a patch element closing off leakage.

Preferably the patch is made of metal possessing good corrosion resistance. Despite use of such materials, a ptach which has been in place for a period of time may be hard to open. It is important therefore that the operating mechanism act positively to propel the edges 15 and 16 toward and away from one another.

A device of the type contemplated by the invention desirably is simple and lightweight. The preferred embodiment has been illustrated and described with considerable precision because it is believed to be a particularly good embodiment of the invention. Other structure within the purview of the invention will occur to those skilled in the art, and, except as is expressly stated in the appended claims, the invention to which this application for patent is directed is not limited to the illustrated preferred embodiment.

I claim:

1. Patching apparatus of the type applied to the external surface of a conduit comprising
   a. a sleeve including a patch element, said sleeve having a split therein with longitudinally extending edges;
   b. an operating mechanism releasably interconnecting said edges and operable when connected to propel said edges to and fro in the circumferential direction, the edges, when said mechanism is disconnected, being separable to permit said sleeve to be placed aroung a conduit;
   c. rotatable operating means for said mechanism including a member extending longitudinally along the sleeve;
   d. two pairs of opposed thrust surfaces carried by said member, a first pair of opposed reaction surfaces carried by said sleeve and engaging one of said pairs of opposed thrust surfaces, a second pair of opposed reaction surfaces connected to said mechanism and engaging the other pair of opposed thrust surfaces, at least one set of interengaging surfaces comprising a threaded connection between said member and the corresponding reaction surfaces.

2. The combination defined in claim 1 in which said mechanism comprises:
   a. a bell crank connected at its apex to one of said edges and swingable about an axis extending radially of the sleeve; said crank, when said sleeve is applied to a conduit, extending along said one edge;
   b. a link releasably connected between the other edge and said one arm; and
   c. the opposed reaction surfaces connected to said mechanism being swiveled on the other arm of said bell crank.

3. The combination defined in claim 2 in which the swivel-mounted reaction surfaces comprise a portion of said threaded connection.

4. The combination defined in claim 2 and a guide projecting circumferentially from one edge of said sleeve and a follower surface on the other edge slidable along said guide.

5. The combination defined in claim 4 in which said member passes through an opening in said guide, and the opposed thrust surfaces of one pair of such surfaces engage opposite faces of the guide.

6. The combination defined in claim 1 in which said operating means includes said member and a rod detachably connected thereto, said rod serving to position said sleeve longitudinally on said conduit.

* * * * *